United States Patent
Engelhart

(10) Patent No.: US 8,762,559 B2
(45) Date of Patent: Jun. 24, 2014

(54) SYSTEM AND METHOD FOR NON-IMS APPLICATION SERVICE ACCESS OVER IP MULTIMEDIA SUBSYSTEM

(76) Inventor: Robert L. Engelhart, Bellevue, WA (US)

( * ) Notice: Subject to any disclaimer, the term of this patent is extended or adjusted under 35 U.S.C. 154(b) by 54 days.

(21) Appl. No.: 13/329,163

(22) Filed: Dec. 16, 2011

(65) Prior Publication Data

US 2013/0159520 A1    Jun. 20, 2013

(51) Int. Cl.
  *G06F 15/16*    (2006.01)
(52) U.S. Cl.
  USPC .......................... 709/230; 709/225; 370/352
(58) Field of Classification Search
  USPC ........................................................ 709/225
  See application file for complete search history.

(56) References Cited

U.S. PATENT DOCUMENTS

| | | | |
|---|---|---|---|
| 7,940,748 B2 * | 5/2011 | Beyer et al. .................... 370/352 |
| 2004/0157605 A1 * | 8/2004 | Nieminen et al. ......... 455/435.1 |
| 2005/0058125 A1 * | 3/2005 | Mutikainen et al. .......... 370/354 |
| 2006/0129646 A1 * | 6/2006 | Rhee et al. .................... 709/206 |
| 2006/0242310 A1 | 10/2006 | Quah et al. |
| 2007/0282911 A1 * | 12/2007 | Bantukul et al. ........... 707/104.1 |
| 2008/0120425 A1 * | 5/2008 | Beyer et al. .................... 709/230 |
| 2009/0017796 A1 | 1/2009 | Foti |
| 2009/0070469 A1 * | 3/2009 | Roach et al. ................... 709/226 |
| 2009/0093237 A1 * | 4/2009 | Levenshteyn et al. ..... 455/412.1 |
| 2009/0168758 A1 | 7/2009 | Apelqvist et al. |
| 2009/0225760 A1 | 9/2009 | Foti |
| 2011/0014923 A1 * | 1/2011 | Krco et al. .................... 455/450 |
| 2011/0307559 A1 | 12/2011 | Son et al. |
| 2012/0072967 A1 * | 3/2012 | Damola et al. ................ 725/148 |
| 2012/0140749 A1 * | 6/2012 | Caldwell et al. ............. 370/338 |
| 2012/0224677 A1 * | 9/2012 | Riley et al. ................. 379/93.01 |
| 2012/0265990 A1 * | 10/2012 | Liu et al. ....................... 713/168 |
| 2012/0282896 A1 * | 11/2012 | Toh .............................. 455/410 |
| 2012/0282924 A1 * | 11/2012 | Tagg et al. ................. 455/432.1 |
| 2013/0072257 A1 * | 3/2013 | Evans et al. ................... 455/558 |
| 2013/0121159 A1 * | 5/2013 | Anthony et al. .............. 370/241 |

OTHER PUBLICATIONS

International Searching Authority, International Search Report and Written Opinion, PCT Application PCT/US2012/069734, mailed Apr. 5, 2013, 13 pages.

* cited by examiner

*Primary Examiner* — Hamza Algibhah
(74) *Attorney, Agent, or Firm* — Perkins Coie LLP

(57) ABSTRACT

A system and method to enable mobile devices to access non-IMS application services over an IP Multimedia Subsystem (IMS) is described herein. In order to access a non-IMS application service via the IMS, messages in a format that are suitable for exchange with the non-IMS application service are encapsulated by the mobile device user agent into SIP messages. The SIP messages are then routed by the IMS to a services gateway. The services gateway extracts the application service messages from the SIP messages and provides the extracted messages to the appropriate application service. In this fashion, the mobile device is able to request services from an application service via SIP messaging, even if the requested application service does not support SIP messaging.

17 Claims, 4 Drawing Sheets

SYSTEM AND METHOD FOR NON-IMS APPLICATION SERVICE ACCESS OVER IP MULTIMEDIA SUBSYSTEM

BACKGROUND

The IP Multimedia Subsystem (IMS) is an architectural framework for delivering internet protocol (IP) multimedia to mobile users over various types of wireless and fixed networks. Through advancements in wireless access technologies, IP based communications for multimedia application services became available for various types of mobile devices. Subscribers of second and third generation mobile communication networks are offered application services which require access to special network subsystems such as the IMS. Examples of such application services include white board discussions, video conferencing, Push to talk over Cellular (PoC), Voice over IP (VoIP), real-time content sharing including video/audio files, instant messaging, interactive gaming, and the like. One of the challenges posed by IP multimedia application services is to provide a good user experience with these media application services across a variety of computing and mobile devices running over diverse networks (e.g., different types of wireless networks, fixed networks, or the like).

The IMS employs Session Initiation Protocol (SIP) for session management, including, for example, to establish, modify, and terminate media sessions for various application services. In the IMS paradigm, several application services may be combined into a single session. SIP provides a control architecture which is able to handle the corresponding messages and sessions.

A number of application services are based on more than one protocol. For example, some applications include communication based on the hypertext transfer protocol (HTTP) between a client and the network. However, the IMS does not provide any means to handle protocols other than SIP. Accordingly, the system and method described herein relates to routing non-SIP messages via the IMS.

DETAILED DESCRIPTION

Figure 1:
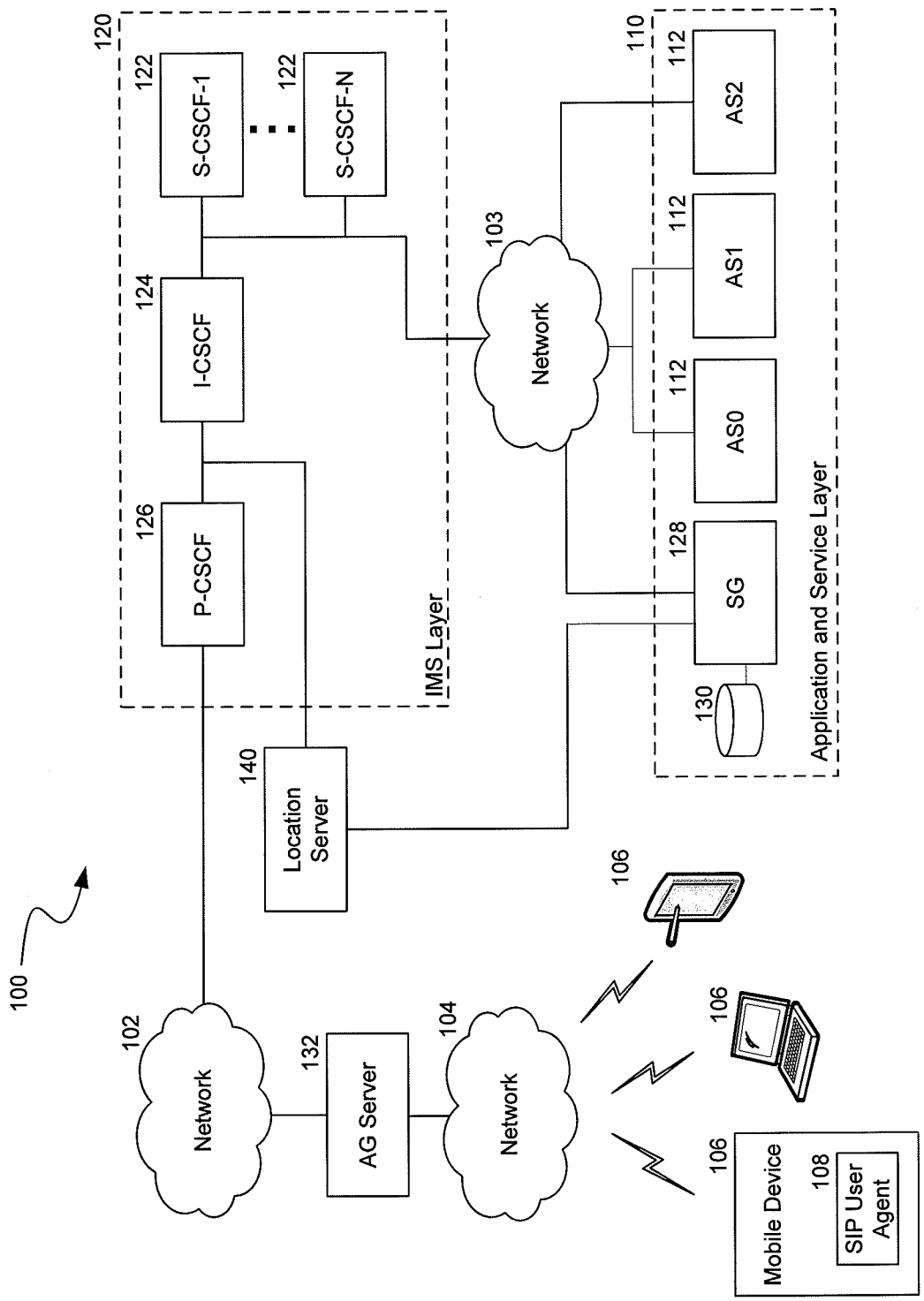
FIG. 1 is a block diagram that illustrates an exemplary IP Multimedia Subsystem (IMS) network over which traffic may be routed to non-IMS application services.

A system and method to enable mobile devices to access non-IMS application services via an IP Multimedia Subsystem (IMS) is disclosed herein. A mobile device contains a Session Initiation Protocol (SIP) user agent that allows the mobile device to register a communications session with the IMS using a SIP request. In order to access a non-IMS application service via the IMS, messages in a format that are suitable for exchange with the non-IMS application service (e.g., messages using Hypertext Transfer Protocol (HTTP)) are encapsulated by the mobile device user agent into SIP messages. The SIP messages are then routed by the IMS to a services gateway. The services gateway includes a plurality of input and output ports that connect to proxy and serving call session control functions of the IMS and a plurality of application services servers. The services gateway extracts the application service messages from the SIP messages and provides the extracted messages to the appropriate application service. In this fashion, the mobile device is able to request services from a non-IMS application service via SIP messaging, even if the requested application service does not support SIP messaging.

When the non-IMS application service sends messages to the mobile device, the services gateway operates to convert messages from the application service into SIP messages for communication to the mobile device. That is, messages from the application service (e.g., HTTP messages) are encapsulated by the services gateway into SIP messages. The SIP messages are then routed to the requesting mobile device. In this fashion, the mobile device is able to receive services from non-IMS application services via the IMS.

In some embodiments, the communication session between the mobile device and the application service is authenticated by the serving call session control function (S-CSCF) in the IMS. Once authenticated, the services gateway may control access between the mobile device and any particular application service. That is, the services gateway may restrict the mobile device from accessing certain application services based on, for example, an identifier associated with the mobile device (e.g., the Mobile Subscriber ISDN Number (MSISDN) of the mobile device, Public User Identity (IMPU), Private User Identity (IMPI), a combination of identities, or a combination of identities and transport layer IP addresses or host names, or x.509 certificates, i.e. from a known trusted source such as the home network S-CSCF). Access restrictions to certain application services may be periodically imposed and lifted by the mobile device service provider.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram that illustrates an exemplary IMS network over which traffic may be routed between mobile devices 106 and application services 112. FIG. 1 is intended to provide a general overview of a network environment 100 where embodiments of the disclosed technology may be implemented.

As shown in FIG. 1, the network environment 100 includes an Application and Service Layer 110, an IMS Layer 120, and one or more access gateway servers 132. The network environment 100 further includes one or more networks 102, 103, 104 such as IP and telephony core networks, as generally defined by 3GPP and 3GPP2 standards and organizations based on IETF Internet protocols. The networks 102, 103, and 104 may also be any other kind Of networks, such as 2G, 3G, 4G, WiFi, WiMax, etc. The networks 102, 103, and 104 may be secure networks or networks that provide secure connections. The network environment 100 depicted in FIG. 1 has been simplified for purposes of highlighting the disclosed technology, and one skilled in the art will appreciate that additional components may be utilized within the various depicted layers.

The IMS layer 120 includes several types of IMS servers. In general, the IMS layer 120 carries out the primary SIP signaling functions in the IMS core network. The IMS servers may include a Proxy CSCF (P-CSCF) 126 which is the first point of contact for mobile devices in a visiting or home network. The P-CSCF may route communications to a home network, an Interrogating-CSCF (I-CSCF) 124 which is the entry point of the mobile device's domain (e.g., the home network where the I-CSCF is located) if the S-CSCF is not already known by the P-CSCF, and one or more Serving-CSCFs (S-CSCFs) 122 which manage session control functions, and the like.

By way of example, when a mobile device 106 transmits a SIP registration request, the P-CSCF 126 forwards the request to an I-CSCF 124 of the mobile device's home network, which determines a S-CSCF 122 responsible for delivering the services to the mobile device end user. The S-CSCF executes comprehensive session control based on the services of the mobile device user (the requesting party) and the terminating party.

The IMS layer 120 provides a horizontal control layer that isolates the access network from the Application and Service Layer 110. Generally, the Application and Service Layer 110 does not need to have its own control functions, as the IMS layer 120 provides those control functions. Separating application services into an application and service layer 110 allows third party service providers to easily integrate and deploy services on the IMS infrastructure.

The Application and Service Layer 110 includes one or more application services (AS) 112. The application services 112 are implemented on one or more servers that host and execute particular applications, such as e-commerce applications, mobile gaming applications, presence services, visual voice mail, location-based service applications, and enterprise applications (e.g., enterprise resource planning software (ERP), customer relationship management software (CRM), supply chain management (SCM) applications, photo album, address book, and social networking services). In order to enable location-based application services, a location server 140 may maintain geographic information that is associated with mobile devices that access the IMS core network. For example, the location server 140 may maintain a record of current or past locations of a mobile device 106, such as the latitude and longitude of the mobile device. Such location information may be used by the application services to provide robust location-based services to mobile devices.

The Application and Service Layer 110 also includes a services gateway (SG) 128. The SG 128 maintains the trigger points (TP) of services and pointers to application services 112 where specific application service logic resides. The S-CSCF 122 communicates with the SG 128, which determines the appropriate non-SIP, e.g. HTTP, application service to access and provide requested application services to a mobile device.

Although some of the application services 112 may be accessed via SIP, many of the application services 112 are accessed via non-IMS protocols, such as via hypertext transfer protocol (HTTP) or other similar communication protocols. An application server that communicates using a non-IMS protocol is referred to herein as a "non-IMS application server" and the provided service as a "non-IMS application service." The system described herein allows non-IMS application services 112 to be accessed by mobile device via the IMS layer 120 using SIP messaging.

In order to connect with non-IMS application services 112, a SIP user agent 108 is introduced into the mobile device 106. The SIP user agent 108 encapsulates non-SIP messages into SIP messages. For example, the user agent 108 encapsulates HTTP messages into SIP messages. The SIP messages containing the encapsulated HTTP messages are provided to the IMS and ultimately routed to the SG 128.

In the case where the applications services 112 are IMS application services, the SG 128 routes SIP messages directly to the applications services 112. In the case where the application services 112 are non-IMS application services, however, the SG 128 extracts non-SIP message content (e.g., HTTP messages) from SIP messages and provides the extracted messages to the appropriate application service. In this fashion, non-SIP message content may be routed from the mobile device to a non-IMS application service.

When a non-IMS application service 112 transmits a non-SIP message (e.g., HTTP messages) to a mobile device, the message is initially routed to the SG 128. Non-SIP messages received by the SG 128 are encapsulated by the SG 128 into SIP messages and forwarded to the addressed mobile device. At the mobile device, the SIP user agent 108 extracts non-SIP messages (e.g., HTTP messages) from the SIP messages received from the SG 128. In this fashion, non-SIP message content may be routed from a non-IMS application service to a mobile device. It will be appreciated that by performing such encapsulation and extraction, the SIP user agent 108 and the SG 128 enable non-IMS application services to be utilized by mobile devices via the IMS without modification.

In addition to converting messages sent between mobile devices 106 and application services 112, the SG 128 may also control access to non-IMS application services based on the identity of the requesting mobile device, the requested service, and the origin of the IP request, e.g. from a trusted source (the S-CSCF) indicating that the user had been authenticated by the IMS network. To perform access control, the SG 128 may access a central repository/database 130 that contains subscriber- or user-specific data, including, but not limited to, user authorizations, service permissions, user profiles, user preferences, transport layer IP address or hostname origin e.g. message is from a trusted host, etc. The database 130 may contain an access control list, i.e., a mapping of a unique identifier associated with a mobile device, such as a Mobile Subscriber ISDN Number (MSISDN), a Public User Identity (IMPU), or Private User Identity (IMPI) and a set of authorized application services that may be accessed by that mobile device. The database 130 may alternatively or in addition contain a mapping of those application services to which access is expressly denied to a mobile device. When requests to access a particular application service are received by the SG 128, the SG consults the database 130 to determine whether the access is authorized. The SG 128 allows the mobile device to access those services that are authorized, while the SG denies access by the mobile device to those services which are not authorized. The service provider for a mobile device may define the access rules that are implemented by the SG to limit access to subordinate application servers. Specific embodiments may include but are not limited to criteria such as user identity, transport layer message origin address, network authentication status, network registration status, a token, e.g., authentication, authorization, cookie, etc embedded in the http message, outstanding account balance, conformance with a service plan, parental restrictions, features of the mobile device supported or not supported by the requested application service, etc.

It will be appreciated that the network environment 100 may include one or more networks that correspond to a number of IP-based and other networks such as the Internet, DSL networks, public switched telephone networks ("PSTN") and other wire-line networks (e.g., SS7-based networks), wireless networks such as those using CDMA, GSM, IEEE 802.11x, and/or UMTS communications or the like, and local area networks. For example, the IP-core network 102 may be interfaced with other networks 104 through an access gateway server 132. An access gateway server 132 may include a Gateway GPRS Support Node (GGSN) for General Packet Radio Service (GPRS), a Packet Data Gateway (PDG) for WiFi, Systems Architecture Evolution Gateway (SAE-GW) or a Packet Data Network Gateway (PDN-GW) for 3GPP Long Term Evolution (LTE), and the like.

Mobile devices 106 are electronic devices capable of communicating with one another over the network(s) in the network environment 100. The mobile devices 106 are wireless devices with high-speed data transfer capabilities, such as those compliant with 3G or 4G standards, and the like. As will be appreciated by one skilled in the art, the computing/communication devices 106 may include a variety of configurations or forms such as, but not limited to, laptop or tablet computers, personal digital assistants (PDAs), hybrid PDA/mobile phones, mobile phones, smart phones, media players, mobile messaging devices, portable gaming devices, home messaging hub devices, digital picture frame devices, and the like. Although exemplary mobile electronic devices are described, any electronic device or subscriber with access to an IMS subscription may be used.

Further, as will be appreciated by one skilled in the art, the mobile devices 106 communicate with one another over the networks in a standard manner, depending on the particular networks used and the particular type of mobile device. Each mobile device may operate in communications frequency bands such as the cellular telephone bands at 850 MHz, 900 MHz, 1800 MHz, and 1900 MHz, the global positioning system (GPS) band, data service bands such as the 3G data communications band (e.g., the Universal Mobile Telecommunications System (UMTS) communication band), the WiFi (IEEE 802.11) band, the Bluetooth band and the like. The mobile device may include circuitries that are required to support one or more of following: the General Packet Radio Service (GPRS) standard, Enhanced Digital GSM Evolution (EDGE), or Evolution of GSM (E-GSM) standard, Code Division Multiple Access (CDMA) standard, Wideband Code Division Multiple Access (WCDMA or W-CDMA) standard, Orthogonal Frequency Division Multiplex (OFDM) standard, Time Division Multiple Access (TDMA) standard, Long-Term Evolution (LTE), and other standards.

Figure 2:
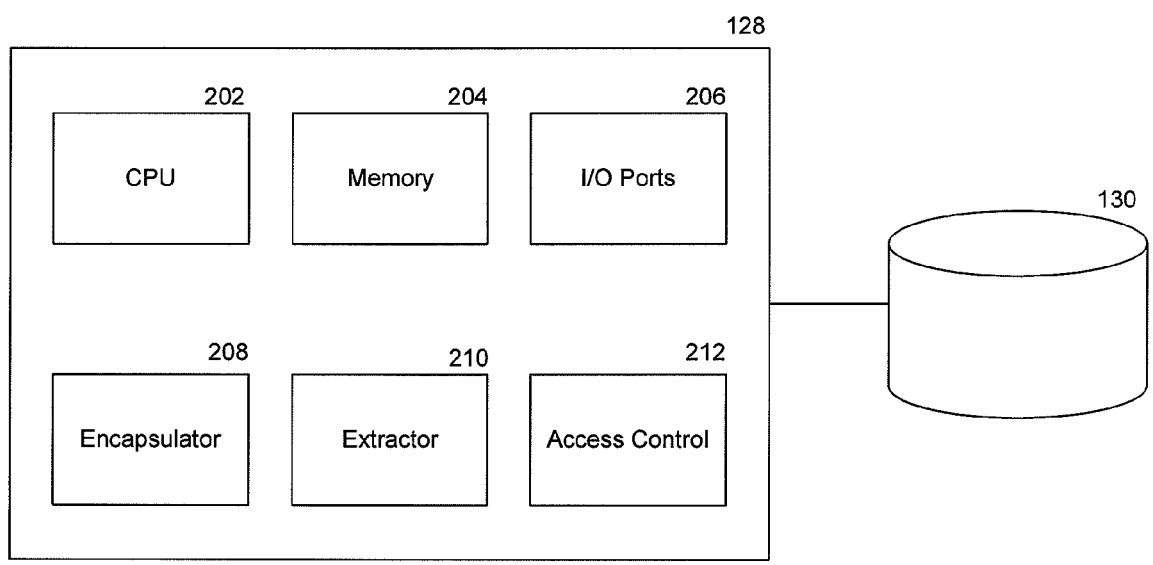
FIG. 2 is a block diagram that illustrates an exemplary services gateway that facilitates access to non-IMS application services.

FIG. 2 is a block diagram that illustrates an exemplary services gateway (SG) 128 that allows access to non-IMS application services. As shown in FIG. 2, the SG 128 includes a central processing unit (CPU) 202, memory 204, input/output ports 206, encapsulator 208, extractor 210, and access control module 212. The SG 128 is coupled to the central repository/database 130. The components of the SG may communicate with one another using one or more communication protocols and/or local communication buses. Other modules, such as security and web services, may also be contained on the SG 128.

The SG 128 communicates with the CSCFs 122, 124, and 126, location server 140, and application services 112 through the input/output ports 204. For example, the S-CSCF 122 may extract the service information of the user, including user authorizations, from the central repository/database 130. The functions of the SG 128 are then executed by the CPU 202 which is coupled to memory 204.

The SG 128 includes an encapsulator 208 and extractor 210. The encapsulator 208 and extractor 210 may be implemented in hardware or in software, as separate components or as a single unit. The extractor 210 extracts non-SIP messages that were previously encapsulated into a SIP message. The extracted non-SIP messages are then sent to application services 112 that do not communicate using SIP, as discussed above. Similarly, the encapsulator 208 encapsulates non-SIP messages received from application services 112 into SIP messages. The encapsulated non-SIP messages are then sent to mobile devices 106 as SIP messages. For example, an HTTP message from an application service may be encapsulated into a SIP message before transmission to a mobile device.

Encapsulation may be performed using several encapsulation techniques. Exemplary encapsulation techniques will now be discussed, but other encapsulation techniques may also be used. One way to encapsulate an HTTP message is to indicate a Content-Type of "message/http" in a SIP invite message header and embed the HTTP message in the SIP message body. Alternatively, an extension Content-Type Header with a proprietary value may be used, e.g. message/x-tmobile-http, to indicate a message body with an encapsulated HTTP message that requires special handling by the SG 128. In another alternative, for large HTTP messages, a SIP media session may be established between the SIP user agent 108 on a mobile device 106 and a SIP user agent on the SG 128, and HTTP messages may be exchanged across the media session.

The central repository/database 130 may contain subscriber- or user-specific data, including, but not limited to, user authorizations, service permissions, user profiles, user preferences, a mapping of a unique identifier associated with a mobile device to a set of authorized application services that may be accessed by that mobile device, etc. For example, each mobile device may be identified by a Mobile Subscriber ISDN Number (MSISDN), and each mobile device associated with a set of authorized application services. By accessing, for example, the mapping of authorized services accessible by a mobile device, the SG 128 controls access to the application services 112. That is, the access control module 212 in the SG allows mobile device to access those services that are authorized, while the access control module denies access by the mobile device to those services that are not authorized.

Figure 3:
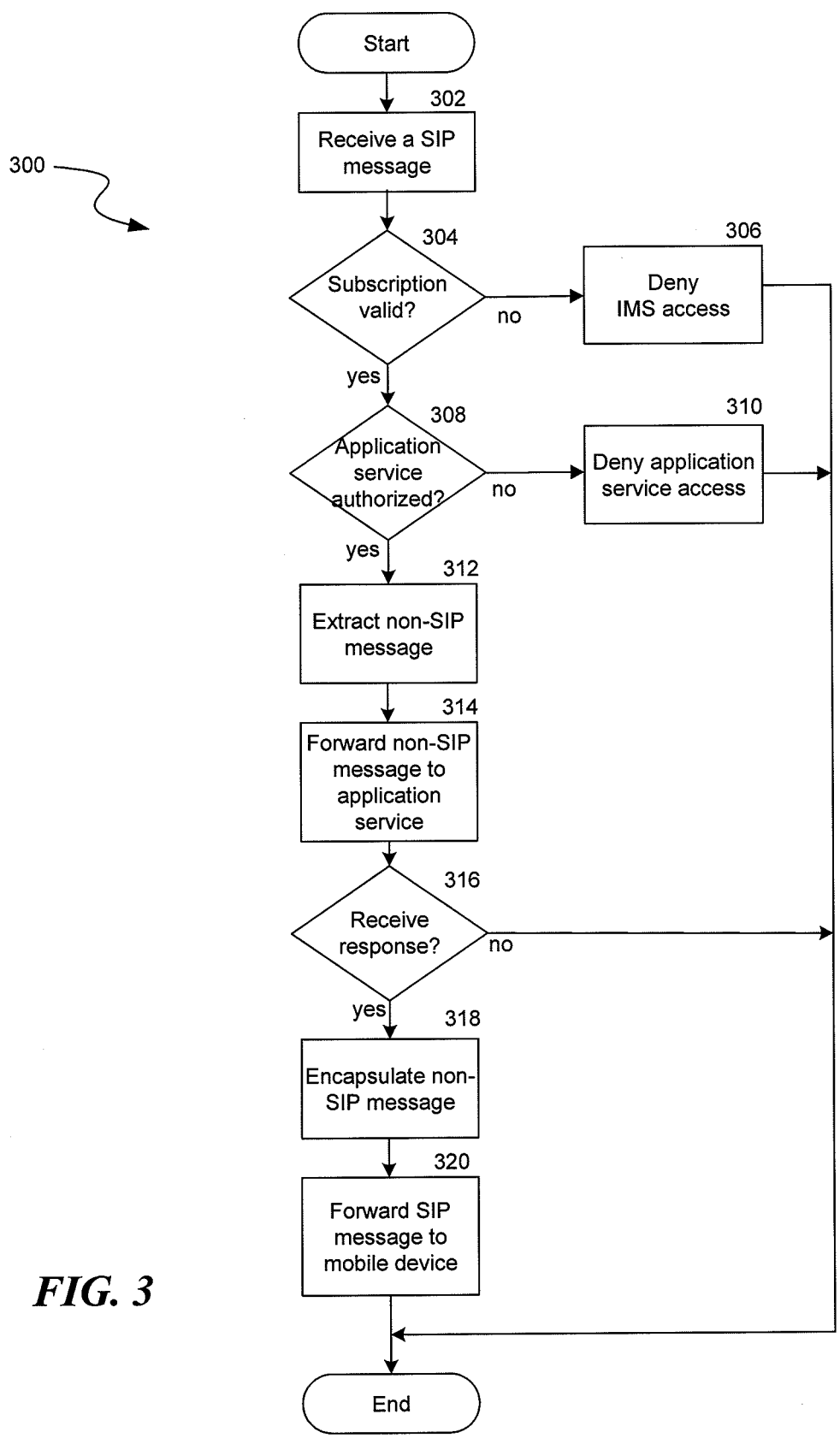
FIG. 3 is a flow chart that illustrates an exemplary method for authenticating, authorizing, and enabling non-SIP messages to be transmitted between mobile devices and application services via an IMS.

FIG. 3 is a flow chart that illustrates an exemplary method 300 for authenticating, authorizing, and enabling non-SIP messages to be transmitted between mobile devices and application services via an IMS. As shown in FIG. 3, at block 302 a SIP message for transmission to an application service is received from a mobile device. At decision block 304, the S-CSCF 122 determines whether the mobile device is allowed to create an IMS session. If the mobile device is not authenticated by the S-CSCF, access to the IMS core network is denied at block 306 and processing is terminated. If the mobile device is authenticated by the S-CSCF, however, an IMS session is established and processing continues to a decision block 308.

At decision block 308, the SG 128 determines whether the mobile device should be allowed to access the requested application service. As discussed herein, the SG makes the access determination based on, for example, the origin of the message on the IP transport layer, i.e. from a trusted host, a mapping between a unique mobile device identifier and application services that are authorized for that mobile device. If the mobile device is not authorized to access the requested application service at decision block 308, processing continues to a block 310 where the SG denies access to the mobile device. If, however, the mobile device is authorized to access the requested application service, processing continues to a block 312.

At block 312, the non-SIP message that is destined for the application service is extracted from the received SIP message. As described herein, the extractor 210 of the SG 128 may perform this step. At block 314, the extracted non-SIP message is then sent from the services gateway 128 to the addressed application service 112.

At a decision block 316, the SG 128 determines whether a responsive message has been received from the application service 112 for delivery to the mobile device 106. If no message has been received, processing terminates. If a message has been received, however, processing continues to a block 318. At block 318, the SG 128 encapsulates the non-SIP message received from the application service 112 into a SIP message. As discussed herein, the encapsulator 208 of the SG may perform this step. At block 320 the SIP message is then routed to the addressed mobile device. It will be appreciated that the process described in blocks 312-320 is continuously repeated throughout a particular IMS session to enable a mobile device to access a non-IMS application service.

Figure 4:
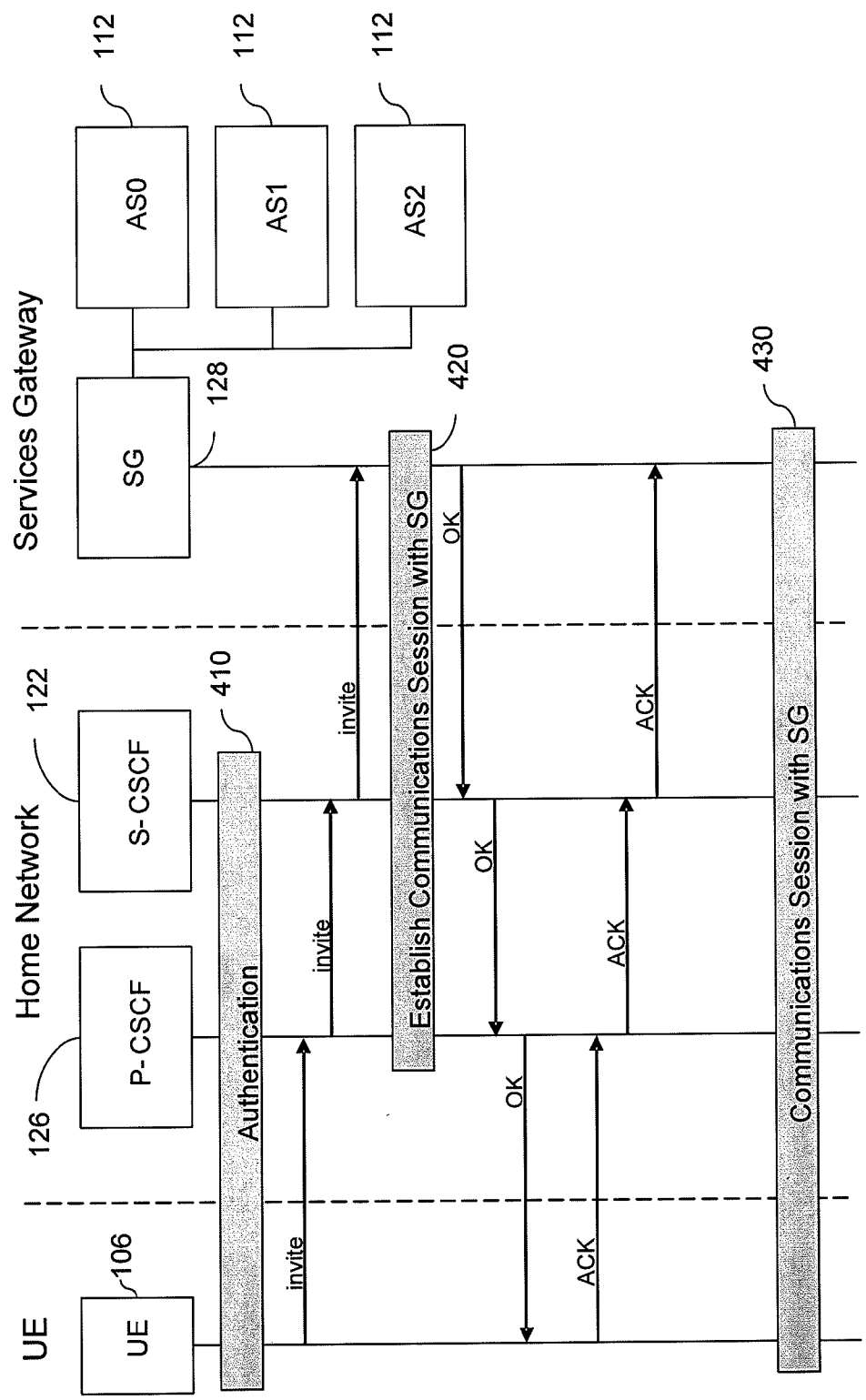
FIG. 4 is a signaling diagram that illustrates representative messaging used to establish a communication session in the exemplary IMS network.

FIG. 4 is a signaling diagram that illustrates representative messaging used to establish a communication session in the exemplary IMS network. The exemplary IMS network includes a home network and a services gateway 128. The home network includes several types of IMS servers including the P-CSCF 126 and S-CSCF 122. The home network may be accessed by first accessing a visiting network.

As shown in FIG. 4, a mobile device 106 may initiate a communication session by sending a SIP invite message to the P-CSCF of a visiting network. The P-CSCF routes communications from the visiting network to a home network of the mobile device. The P-CSCF 126 of the home network receives the invite message and routes it to S-CSCF 122. After receiving the invite message, the S-CSCF 122 may authenticate the mobile device, as described above and shown at step 410. Next, the S-CSCF 122 forwards the SIP invite to the SG 128 to establish a communication session with the SG 128. Once the SG 128 accepts the invite message, an OK message is returned to the S-CSCF 122 and relayed back to the mobile device 106. Establishing a communication session with SG 128 is shown at step 420. An acknowledgment (ACK) message is then relayed from the mobile device 106 to the SG 128 confirming the establishment of a communication session. The mobile device 106 may then access application services 112 through the IMS network as described herein and shown at step 430.

It will be apparent to those skilled in the art that various modifications and variations can be made in the system and method for non-IMS application service access over IMS disclosed herein. For example, the depicted flow charts may be altered in a variety of ways. The order of the steps may be rearranged, steps may be performed in parallel, steps may be omitted, or other steps may be included. As another example, the actual implementation of the database may take a variety of forms, and the term "database" is used herein in the generic sense to refer to any area that allows data to be stored in a structured and accessible fashion using such applications or constructs as databases, tables, linked lists, arrays, and so on. Thus, it is intended that the present invention cover the modifications and variations of this invention provided they come within the scope of the appended claims and their equivalents.

I claim:

1. A services gateway to enable subscribers to access application services over an internet protocol multimedia subsystem (IMS), the services gateway comprising:
    a dataset that, for each of a plurality of subscribers, indicates those application services to which access is allowed or denied for each subscriber;
    a memory storing computer-executable instructions of:
        an access control module that is configured to:
            receive a first Session Initiation Protocol (SIP) message from a first subscriber via an internet protocol multimedia subsystem (IMS), the first SIP message intended for a first non-IMS application service of a plurality of non-IMS application services, the access control module accessing the dataset and allowing access to the non-IMS application service by the first subscriber if the dataset indicates access is allowed and denying access to the non-IMS application service by the first subscriber when the dataset indicates access is denied, and
            receive a second SIP message from a second subscriber via the IMS, the second SIP message intended for a second non-IMS application service of the plurality of non-IMS application services, the access control module accessing the dataset and allowing access to the non-IMS application service by the second subscriber when the dataset indicates access is allowed, and denying access to the non-IMS application service by the second subscriber if the dataset indicates access is denied;
        an extractor that is configured to
            extract a first non-SIP message from the first SIP message and forward the first non-SIP message to the intended non-IMS application service when access to the application service is allowed by the access control module,
                wherein the first non-SIP message is an HTML message, and
            extract a second non-SIP message from the second SIP message and forward the second non-SIP message to the intended second non-IMS application service when access to the application service is allowed by the access control module,
                wherein the second non-SIP message is not an HTML message; and
        an encapsulator that is configured to receive non-SIP messages from an application service, encapsulate the non-SIP messages into SIP messages, and forward the SIP messages to an appropriate subscriber via the IMS; and
    a processor for executing the computer-executable instructions stored in the memory.

2. The services gateway of claim 1, wherein the access delivery module assesses whether a subscriber is permitted to access a particular application service based on a unique identifier associated with the subscriber.

3. The services gateway of claim 2, wherein the unique identifier is a Mobile Subscriber ISDN Number (MSISDN).

4. The services gateway of claim 1, wherein the application services include application services that are accessible via SIP messaging and application services that are not accessible via SIP messaging.

5. The services gateway of claim 1, wherein the access control module further provides information about whether a subscriber is allowed access to an application service to a serving call session control function (S-CSCF) server.

6. The services gateway of claim 1, wherein the application services include social networking services, e-commerce services, mobile gaming services, location-based services, or enterprise application services.

7. A services gateway for connecting to an internet protocol multimedia subsystem, the services gateway comprising:
a plurality of input and output ports that connect to proxy and serving call session control functions of an internet protocol multimedia subsystem (IMS) and a plurality of non-IMS application services servers;
a memory storing computer-executable instructions of:
an extractor that is configured to extract a first non-SIP message from a first SIP message and a second non-SIP message from a second SIP message,
the first non-SIP message originating from a first subscriber and encapsulated into the first SIP message by a user agent at the first subscriber before being routed via the IMS to the services gateway, the first non-SIP message being forwarded by the services gateway to one of the plurality of non-IMS application services servers,
the second non-SIP message originating from a second subscriber and encapsulated into the second SIP message by a user agent at the second subscriber before being routed via the IMS to the services gateway, the second non-SIP message being forwarded by the services gateway to another of the plurality of non-IMS application services servers,
wherein the first non-SIP message is an HTTP message, and
wherein the second non-SIP message is not an HTTP message;
an encapsulator that is configured to encapsulate a non-SIP message into a SIP message, the non-SIP message originating from one of the plurality of non-IMS application services servers, the SIP message being routed by the services gateway to an appropriate subscriber via the IMS; and
a processor for executing the computer-executable instructions stored in the memory.

8. The services gateway of claim 7, further comprising:
a user information storage unit that includes a database that associates the subscriber with a set of authorized services; and
an access control module that authorizes subscriber access to application services based on the database.

9. The services gateway of claim 7, wherein the services gateway provides authorization information of the subscriber to the serving call session control function of the IMS.

10. The services gateway of claim 7, wherein the extractor and encapsulator are incorporated in a single unit.

11. The services gateway of claim 7, wherein one of the plurality of application servers enables one or more of social networking services, e-commerce services, mobile gaming services, location-based services, or enterprise application services.

12. A method for connecting subscribers to application services of a plurality of application services via an internet protocol multimedia subsystem (IMS), the method comprising:
receiving a first encapsulated message from a first subscriber via an internet protocol multimedia subsystem (IMS), the first encapsulated message intended for a first non-IMS application service and comprising a first non-SIP message within a first SIP message;
extracting the first non-SIP message from the first SIP message to obtain a first extracted message;
forwarding the first extracted message to the intended first non-IMS application service;
receiving a second encapsulated message from a second subscriber via an internet protocol multimedia subsystem (IMS), the second encapsulated message intended for a second non-IMS application service and comprising a second non-SIP message within a second SIP message;
extracting the second non-SIP message from the second SIP message to obtain a second extracted message; and
forwarding the second extracted message to the intended second non-IMS application service
wherein the first non-SIP message is an HTML message, and
wherein the second non-SIP message is not an HTML message.

13. The method of claim 12, further comprising:
determining whether the first subscriber is authorized to use the non-IMS application service; and
refraining from forwarding the first extracted message to the intended first non-IMS application service if the first subscriber is not authorized to use the non-IMS application service.

14. The method of claim 13, wherein the determination of whether the subscriber is authorized to use the non-IMS application service is based on a Mobile Subscriber ISDN Number (MSISDN) of the subscriber.

15. The method of claim 12, further comprising:
receiving a third non-SIP message from a non-IMS application service, the third non-SIP message intended for a subscriber;
encapsulating the third non-SIP message into a third SIP message to generate a third encapsulated message; and
forwarding the third encapsulated message to the intended subscriber over the IMS.

16. The method of claim 12, wherein the first encapsulated message is generated by a user agent on the sending first subscriber.

17. The method of claim 12, wherein the first non-IMS application service is a social networking service, e-commerce service, mobile gaming service, location-based service, or enterprise application service.

* * * * *